US006803865B2

(12) United States Patent
DeLuga

(10) Patent No.: US 6,803,865 B2
(45) Date of Patent: Oct. 12, 2004

(54) SPILL-RESISTANT KEYBOARD

(75) Inventor: Ronald E. DeLuga, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/929,869

(22) Filed: Aug. 14, 2001

(65) Prior Publication Data

US 2003/0034904 A1 Feb. 20, 2003

(51) Int. Cl.[7] .................................................. H05K 7/08
(52) U.S. Cl. ........................ 341/22; 361/685; 361/683; 345/168; 345/169
(58) Field of Search ................................ 361/683, 685, 361/757, 679; 341/22, 26; 400/472, 490, 496; 345/169, 168

(56) References Cited

U.S. PATENT DOCUMENTS

| 5,111,364 | A | * | 5/1992 | Yoshimoto et al. | 361/757 |
| 5,525,979 | A | * | 6/1996 | Engle et al. | 341/32 |
| 5,706,168 | A | * | 1/1998 | Erler et al. | 361/685 |
| 5,896,453 | A | * | 4/1999 | Speaks | 379/433.01 |
| 6,156,983 | A | * | 12/2000 | Chen et al. | 200/302.1 |
| 6,467,683 | B2 | * | 10/2002 | Jun | 235/145 R |

* cited by examiner

Primary Examiner—Michael Horabik
Assistant Examiner—Hung Dong

(57) ABSTRACT

An electronic device having a spill-resistant keyboard. The device utilizes a keyboard having a stiff support layer to which the plurality of keys are mounted. The stiff support layer cooperates with one or more water impermeable layers that reduce or prevent the flow-through of water or other liquids inadvertently spilled over the keyboard.

33 Claims, 3 Drawing Sheets

SPILL-RESISTANT KEYBOARD

FIELD OF THE INVENTION

The present invention relates generally to keyboards that are used for inputting data to electronic devices, such as portable computers, and particularly to a spill-resistant keyboard that reduces or eliminates the risk of liquid flowing onto the motherboard or other internal components when spilled over the keyboard.

BACKGROUND OF THE INVENTION

A variety of electronic devices, such as portable computers, utilize a keyboard as an interface for the device. The keyboard allows a user to input data. For example, portable computers, such as laptop and notebook computers, generally have a base housing that encloses a motherboard and variety of other electronic components. The housing includes a top deck portion generally above the motherboard to support a keyboard. However, if liquid is inadvertently spilled over the keyboard, the liquid often is able to flow into the base housing where damage to the motherboard and/or a variety of electronic components can occur. Accordingly, it would advantageous to protect such internal components from liquid spilled onto the keyboard.

SUMMARY OF THE INVENTION

The present invention features a technique for protecting internal components of devices that incorporate a keyboard. For example, the technique is particularly amenable for use with portable computers, e.g. laptop and notebook computers to protect internal components against detrimental effects of liquid spilled over the keyboard. The technique utilizes a keyboard having a stiff support layer to which a plurality of keys are mounted. At least one water impermeable sheet is applied to the stiff support layer to prevent liquid from draining therethrough. This prevents liquid from migrating into contact with internal components of the device. The stiff support layer also may comprise a peripheral lip that helps contain the liquid on the keyboard.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

Figure 1:
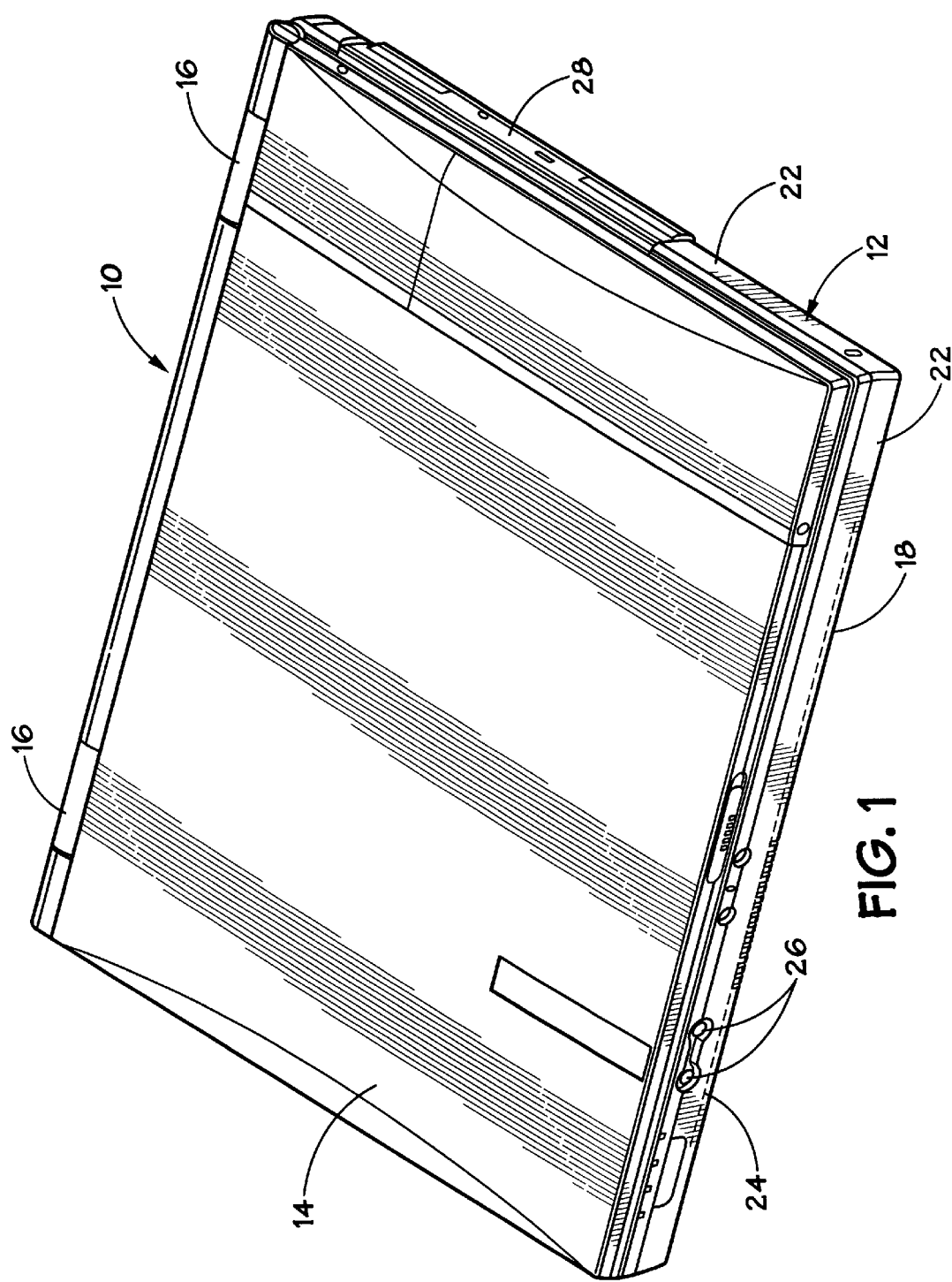
FIG. 1 is a front perspective view of an exemplary portable computer, according to one embodiment of the present invention.

Referring generally to FIG. 1, an exemplary electronic device 10 is illustrated. In this embodiment, electronic device 10 is a portable computer and in particular a laptop or notebook computer. Such portable computing devices are examples of devices that incorporate and benefit from features of the present invention. However, the illustrated device is used as an example only and should not be construed as limiting the scope of the invention to these specific electronic devices. Hereinafter, electronic device 10 is referred to as portable computer 10 to facilitate explanation of the present invention.

Portable computer 10 comprises a base housing 12 coupled to a display 14. Display 14 may be moved between a closed position, as illustrated best in FIG. 1, and an open position, as illustrated best in FIG. 2. In the example illustrated, display 14 is coupled to base housing 12 by a hinge 16 that permits display 14 to be pivoted between the open and closed positions.

Base housing 12 typically has a bottom wall 18, a top deck 20 and a plurality of side walls 22 that generally extend between bottom wall 18 and top deck 20. Base housing 12 encloses a motherboard 24 disposed between bottom wall 18 and top deck 20. As is known to those of ordinary skill in the art, a variety of components, including one or more microprocessors, memory modules, drivers, etc. may be coupled to motherboard 24. Additionally, base housing 12 may be designed to provide openings for a variety of ports 26 and drives 28. The actual type and number of ports, drives and other features will vary with the design objectives of a given device.

Figure 2:
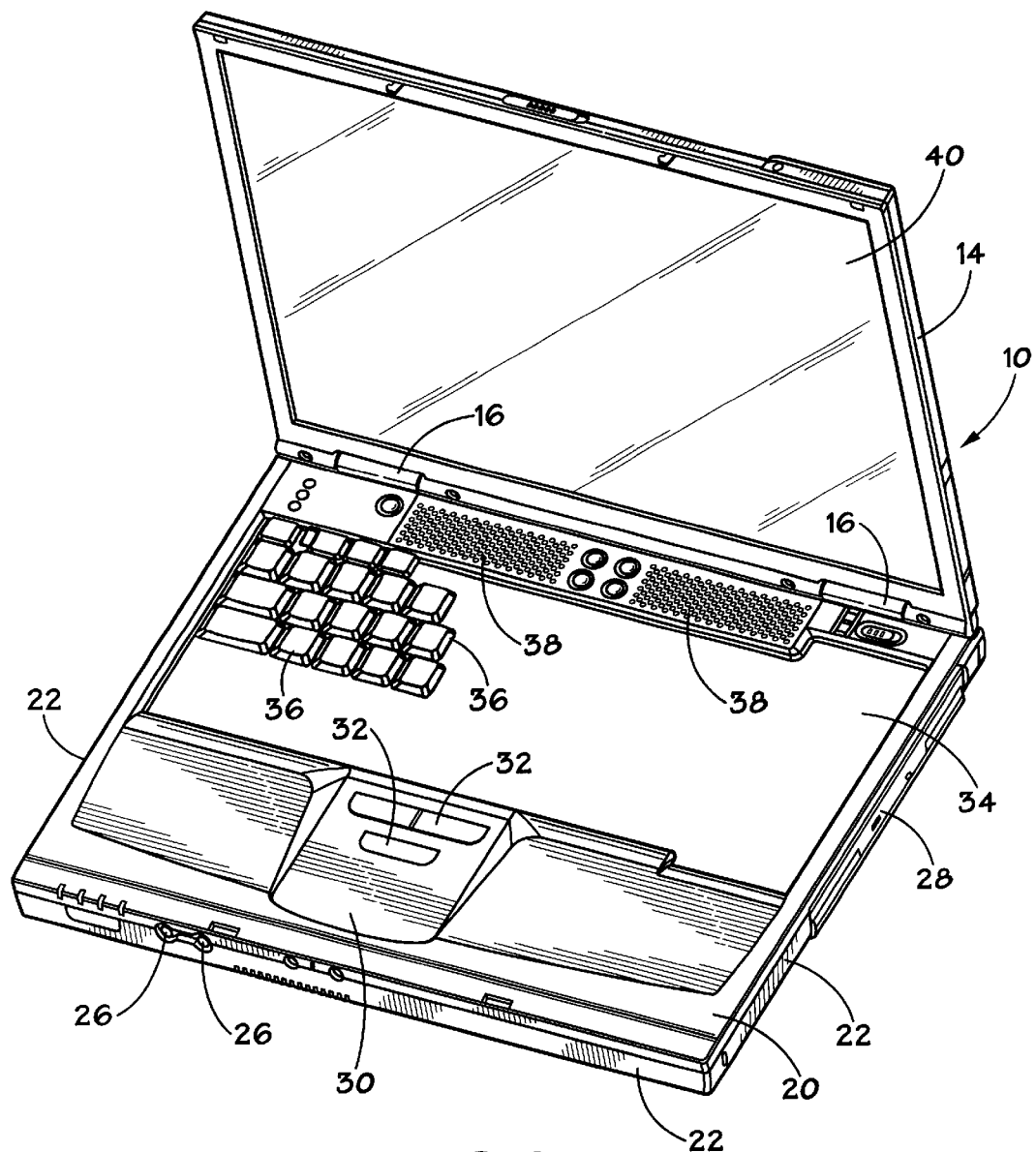
FIG. 2 is a view similar to FIG. 1 but showing a raised display screen.

As illustrated best in FIG. 2, portable computer 10 also includes one or more user interfaces, such as a mouse pad 30 having a plurality of control buttons 32. Another exemplary interface is a keyboard 34 having a plurality of input keys 36. Portable computer 10 also may include a variety of other features, such as speakers 38 to provide audio output.

Display 14 may comprise a variety of displays designed to provide graphical information to a user. An exemplary display 14 is a flat screen display having a screen 40 on which graphical information is viewed.

Figure 3:
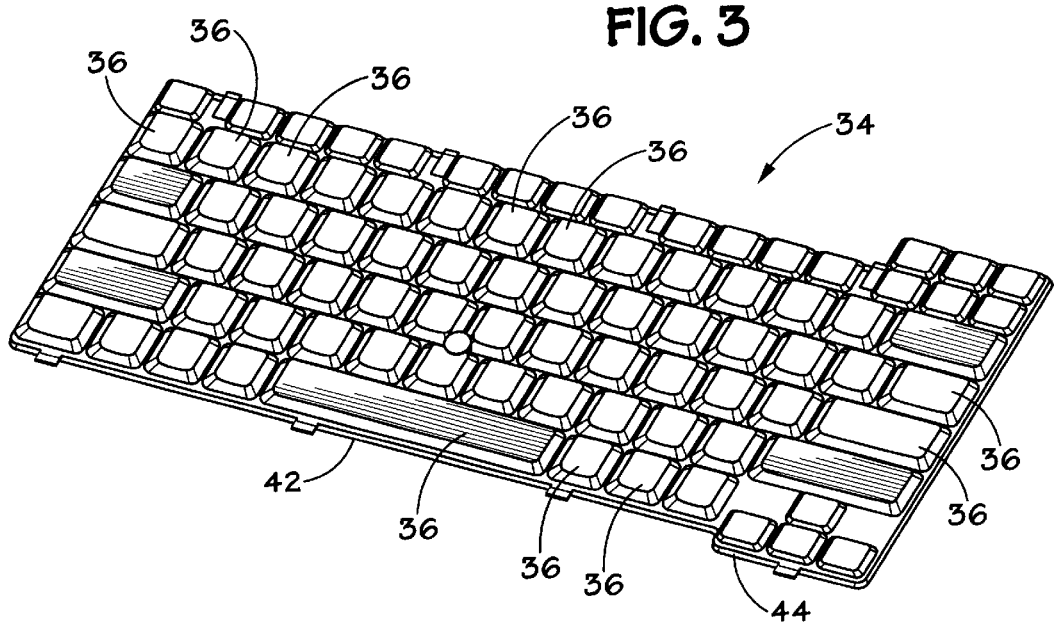
FIG. 3 is a front perspective view of an exemplary keyboard, according to one embodiment of the present invention.

As illustrated in FIG. 3, keyboard 34 may have a variety of keys 36, as would typically be found on a conventional keyboard utilized with, for example, a laptop or notebook computer. The actuation of keys 36 is generally the same as with a conventional keyboard and is known to those of ordinary skill in the art. Keys 36 are mounted to a support layer 42 that is formed from a relatively stiff material to support the numerous keys 36. An exemplary material is a metallic material, such as aluminum, that provides a relatively light but stiff base on which keys 36 are mounted.

In the embodiment illustrated, support layer 42 includes a peripheral lip 44 that extends generally around the perimeter of keyboard 34. Peripheral lip 44 preferably is generally upturned in a direction towards keys 36. The upturned peripheral lip both increases the stiffness of support layer 42 and helps contain liquids that may be inadvertently spilled over keys 36, such that the liquid stays on the keyboard.

Figure 4:
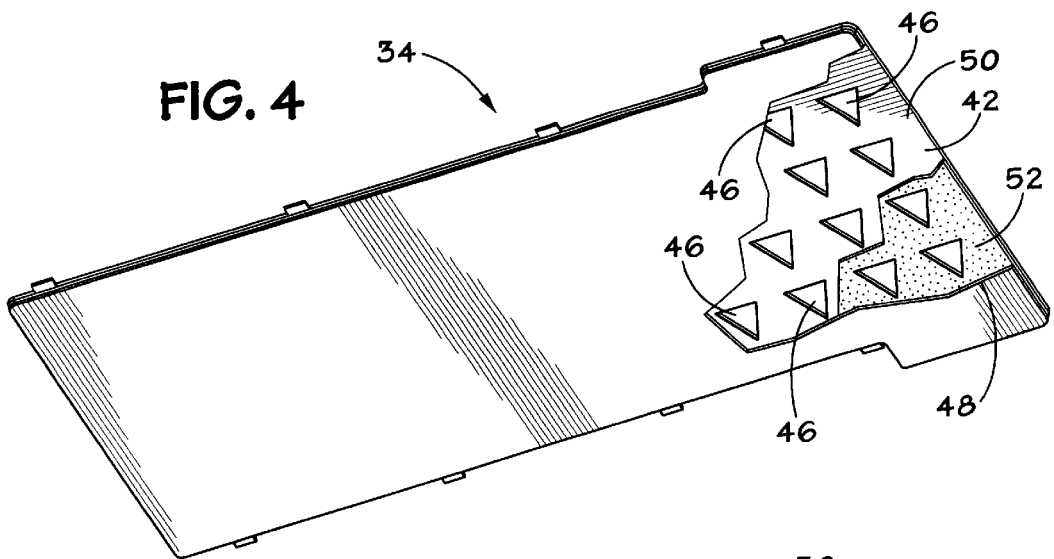
FIG. 4 is a bottom view of the keyboard illustrated in FIG. 3 with a partially cutaway portion.

Additionally, support layer 42 generally includes a plurality of openings 46 formed therethrough, as illustrated in FIG. 4. Openings 46 may be formed through support layer 42 for a variety of reasons. For example, the openings may be formed to reduce weight or save material. Additionally, openings may be formed to accommodate conductors, fastening mechanisms, and other features designed to permit access through support layer 42.

As further illustrated in FIG. 4, the openings are covered by a water impermeable layer 48. Water impermeable layer 48 is disposed between keys 36 and top deck 20 to prevent the flow of liquid into possible contact with components located below top deck 20. In the exemplary embodiment, water impermeable layer 48 comprises a sheet attached to the bottom surface of support layer 42, as further illustrated in FIG. 5. (It should be noted that in FIG. 4, a portion of water impermeable layer 48 is cutaway to better illustrate openings 46.) In one embodiment, water impermeable layer 48 is adhered to a lower surface 50 of support layer 42 by an adhesive 52.

Figure 5:
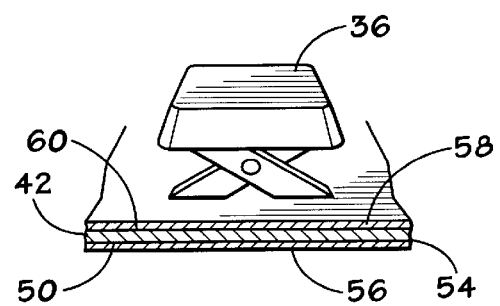
FIG. 5 is generally a cross-sectional view taken along one of the keys of the keyboard illustrated in FIG. 3.

Various materials potentially may be used to form water impermeable layer 48. However, exemplary materials comprise plastic or metallic sheets. Also, layer 48 may comprise a composite layer formed of, for example, a plastic sheet 54 having a metallic film 56, as illustrated in FIG. 5. One such material is sold under the trade name Mylar™.

Other layers also may be incorporated into the design to further reduce the chance of liquid flowing through keyboard 34. For example, a second water impermeable layer 58 may be applied to support layer 42 along a top surface 60 generally opposite lower surface 50. The second water impermeable layer also may be made from a variety of materials, such as rubber sheet materials, plastic sheet materials or composite materials.

It will be understood that the foregoing description is of preferred embodiments of this invention, and that the invention is not limited to the specific forms shown. For example, the keyboard may be incorporated with a variety of electronic devices other than portable computers; the number and arrangement of keys may vary; the support layer may be formed from a variety of materials; the materials used to form the one or more water impermeable sheets may vary according to the application; and the number and arrangement of potential openings through the support layer may change depending on the specific design perimeters and functional requirements of the keyboard. These and other modifications may be made in the design and arrangement of the elements without departing from the scope of the invention as expressed in the appended claims.

What is claimed is:

1. A computer system, comprising:
   a base housing having an upper recess;
   a motherboard in the base housing disposed below the upper recess; and
   a keyboard module mounted in the recess, wherein the keyboard module comprises a stiff support layer to which a plurality of keys are mounted, the stiff support layer having multiple openings therethrough, wherein the multiple openings are covered by a water impermeable sheet.

2. The computer system as recited in claim 1, wherein the water impermeable sheet is adhered to the stiff support layer.

3. The computer system as recited in claim 2, wherein the water impermeable sheet comprises a plastic material.

4. The computer system as recited in claim 2, wherein the water impermeable sheet comprises a composite sheet.

5. The computer system as recited in claim 2, wherein the stiff support layer comprises an aluminum sheet.

6. The computer system as recited in claim 2, wherein the computer system comprises a portable computer.

7. The computer system as recited in claim 2, wherein the stiff support layer comprises an upturned continuous peripheral lip.

8. A system for protecting against damage to a computer due to liquid spillage, comprising:
   a portable computer having a motherboard enclosed in a computer housing, the computer housing having a keyboard top deck disposed over the motherboard and configured to receive a keyboard module, the portable computer further comprising a water impermeable sheet disposed sealingly across openings in a support layer of the keyboard module, wherein the keyboard module comprises a plurality of keys mounted to the support layer, and wherein the support layer is at a base of the keyboard module.

9. The system as recited in claim 8, wherein the water impermeable sheet is adhered to the keyboard module.

10. The system as recited in claim 9, wherein the water impermeable sheet comprises a plastic material.

11. The system as recited in claim 10, wherein the water impermeable sheet comprises a metallic film.

12. The system as recited in claim 8, wherein the water impermeable sheet is a continuous sheet of water impermeable material.

13. The system as recited in claim 8, wherein the stiff support layer comprises an continuous upturned peripheral lip.

14. A method of protecting a portable computer from damage when a liquid is spilled on a keyboard of the portable computer, comprising:
   forming a computer housing having a top deck with a keyboard receiving area;
   locating a keyboard in the keyboard receiving area; and
   deploying a continuous protective layer sealingly across openings in a support layer the keyboard to retain the liquid within keyboard and to restrict flow of the liquid from the keyboard to the keyboard receiving area.

15. The method as recited in claim 14, wherein deploying comprises attaching a water impermeable sheet to the keyboard.

16. The method as recited in claim 14, wherein deploying comprises adhering a water impermeable sheet to the keyboard.

17. The method as recited in claim 16, wherein forming comprises forming the keyboard receiving area as a recessed region.

18. The method as recited in claim 14, wherein deploying comprises aft aching a composite protective layer.

19. A system of protecting a portable computer from damage when a liquid is spilled on a keyboard of the portable computer, comprising:
   means for locating a keyboard in a keyboard receiving area of a computer housing; and
   means for deploying a continuous protective layer sealingly across openings in a support layer of the keyboard to retain the liquid with in the keyboard and to restrict flow of the liquid from the keyboard to the keyboard receiving area.

20. The system as recited in claim 19, wherein the means for deploying comprises an adhesive to couple the continuous protective layer to the keyboard.

21. The system as recited in claim 19, wherein the means for locating comprises a recess disposed in the top deck.

22. The system as recited in claim 20, wherein the continuous protective layer comprises a plastic material.

23. The system as recited in claim 20, wherein the continuous protective layer comprises a composite sheet.

24. A keyboard system comprising:
   a keyboard module comprising:
      a support layer at a base of the keyboard module;
      a plurality of keys mounted on a first side of the support layer; and a continuous water impermeable layer attached to the support layer and extending sealingly across openings in the support layer, wherein the continuous water impermeable layer is adapted to retain fluid spillage within the keyboard module.

25. The keyboard system as recited in claim 24, wherein the continuous water impermeable layer comprises a plastic material.

26. The keyboard system as recited in claim 24, wherein the continuous water impermeable layer comprises a metallic film.

27. The keyboard system as recited in claim 25, wherein the continuous water impermeable layer comprises a metallic film.

28. The keyboard system as recited in claim 25, wherein the support layer comprises an aluminum sheet.

29. The keyboard system as recited in claim 24, wherein the support layer comprises a stiff material.

30. A keyboard module comprising:

a base structure having a recessed portion;

a plurality of keys mounted in the recessed portion; and a fluid impermeable sheet sealing openings in the recessed portion, wherein the recessed portion and the fluid impermeable sheet are adapted to capture fluid and retain the fluid within the keyboard module.

31. The keyboard recited in claim 30, wherein the recessed portion comprises a continuous outer lip.

32. The keyboard recited in claim 30, wherein the fluid impermeable sheet is adhered to the base structure.

33. The keyboard recited in claim 30, comprising an additional fluid impermeable sheet, wherein the fluid impermeable sheet and the additional fluid impermeable sheet are disposed on opposite sides of the recessed portion.

* * * * *